July 18, 1961  J. H. TREVITT  2,993,131
SMALL ELECTRIC MOTOR
Filed March 28, 1955
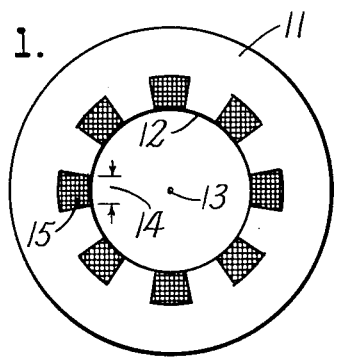
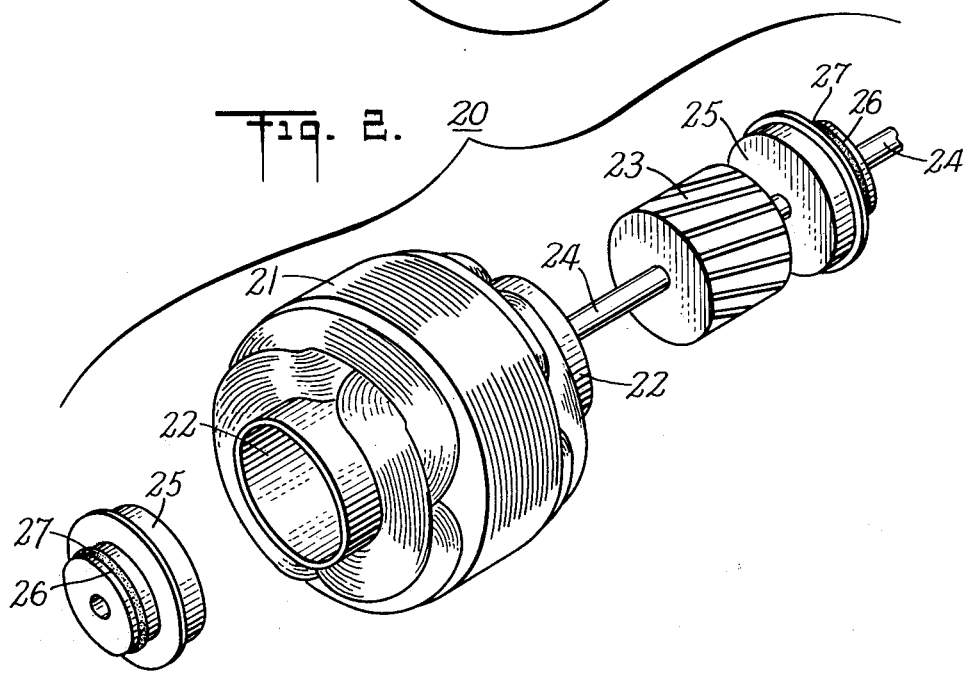
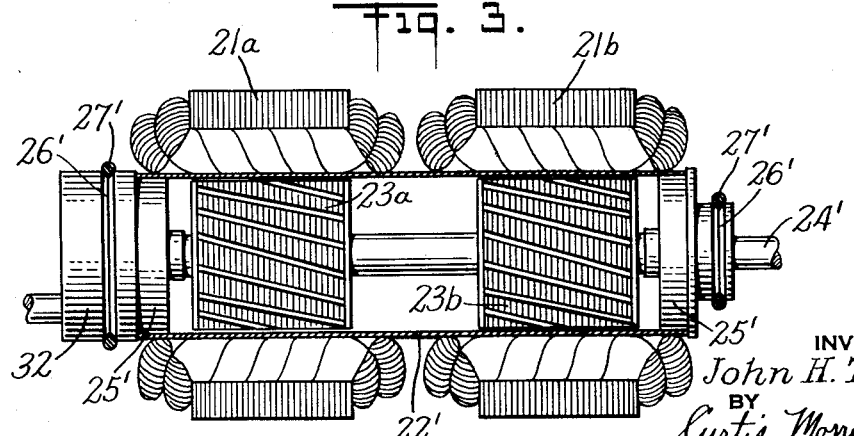
INVENTOR
John H. Trevitt
BY
Curtis, Morris & Safford
ATTORNEYS United States Patent Office 2,993,131
Patented July 18, 1961

2,993,131
SMALL ELECTRIC MOTOR
John H. Trevitt, Bridgeport, Conn., assignor to Dictaphone Corporation, Bridgeport, Conn.
Filed Mar. 28, 1955, Ser. No. 497,011
1 Claim. (Cl. 310—86)

This invention relates to electric motors.

An object of this invention is to improve the electrical and mechanical qualities and at the same time to reduce the manufacturing cost of electric motors.

Another object is to simplify the structures of motors, especially those of small size where this simplification is most fruitful.

Precision instruments, such as recording devices and the like, require vibration-free even-torque motors and frequently, where space is at a premium, they require such motors which are also small in size and high in efficiency. Although motors having a requisite precision and smallness of size are available, their cost is discouraging even for those of minimum acceptable quality. This fact has stimulated the present invention.

Motors of the general type having a wound stator and an armature or rotor, whether wound or unwound, rotating with respect to the stator in the magnetic field set up by the latter's magnetic poles, have certain common quality ratings regardless of motor size. An ideal motor of one type has a perfectly balanced rotor rotating in a purely sinusoidal magnetic field and exactly centered therein. Because the perfectly balanced rotor is rotating exactly in the center of a magnetic field not having harmonic components, the forces acting on the rotor are entirely symmetrical and combine to produce smooth even torque without vibrations. Such a motor, if properly designed, can, partly because of the absence of magnetic field harmonic components, also be made to have the highest obtainable electrical efficiency.

As a practical matter it is impossible to build a motor in which the rotating magnetic field is entirely free of harmonic components, but this ideal can be approached by, among other things, evenly distributing the winding on the stator poles and by making each air space between adjacent pole pieces as small as possible. With stators wound from the inside however, at least some space between the pole tips is necessary as a passageway for inserting the winding coils into the winding slots. Obviously the stator winding operation is easiest, and correspondingly less expensive, when the space between the pole tips is as large or about as large as the winding slot beneath it since this makes possible the insertion of each coil with all of its turns together instead of only one or a few turns at a time. Thus when the space between pole tips is large enough, mass-produced preformed coils can be used whereas this is impractical when these spaces are made small enough for best electrical efficiency. Generally therefore some compromise between providing such a large interpolar space and no space at all is made depending on the considerations outlined above of cost versus quality.

Equally as important to good motors as insuring a purely sinusoidal magnetic field is the necessity of centering the rotor exactly with respect to the magnetic field. This is quite difficult especially where two or more motor bearings are involved because, not only must the individual bearings be aligned relative to each other, but they must both be centered relative to the magnetic field. Moreover to make matters doubly complex, this aligning and centering process is usually most economically performed in several steps rather than in one and so, but for such devices as self-aligning bearings and the like, would be well nigh impossible on a truly mass production basis. The present invention seeks to overcome the above mentioned difficulties by providing a motor structure in which pre-formed stator windings can readily be inserted from the inside into the stator slots and in which the undesirable effects of large interpole spaces and of bearing and rotor misalignments are made negligible if not entirely eliminated. The invention further seeks to provide a motor of great versatility and efficiency but yet one which is small and inexpensive.

In accordance with the present invention in one embodiment thereof the stator and rotor of a motor are rigidly and accurately aligned relative to each other by a one piece tubular member of magnetic material which carries accurately centered bearings for the rotor shaft and, fitting closely against the inner surfaces of the stator lamination, also serves physically and magnetically to close the spaces between the tips of the stator teeth and to retain the stator windings in their respective slots. Moreover, when this tubular member is made of material properly selected for the purpose, the rotating magnetic field within the motor is more nearly sinusoidal than if this tubular member were not present. A reason for this is that the magnetic air gaps between stator teeth are closed by the tubular member and thus there are no discontinuities around the inside of the stator to give rise to "space harmonics" in the magnetic field. The details and further advantages of this arrangement together with a better understanding of the invention will best be gained from the following description given in connection with the drawings in which:

FIGURE 1 is a front view given by way of illustration of a stator lamination with spaces between the tips of the stator poles large enough to permit easy insertion of stator-winding coils into the winding slots;

FIGURE 2 is a partly exploded view with portions broken away of an illustrative embodiment of the invention wherein an assembled stator and its associated windings are mounted upon a one piece tubular member within which a rotor carried by two bearings is free to rotate; and FIGURE 3 is a cross-section view of a second illustrative embodiment of the invention.

FIGURE 1 shows by way of illustration a stator lamination 11 in which pole tips 12 are symmetrically positioned around center axis 13 and are separated from adjacent pole tips by spaces 14. Winding slots 15, having for example cross sections as shown by the shaded areas, carry the stator-winding coils. By making the width of spaces 14 sufficiently large, which may involve making the sides of slots 15 parallel, or almost parallel, pre-formed coils may be inserted with a minimum of effort into their respective slots. As will be seen in FIGURE 2, after the stator laminations have been assembled, the space between poles can effectively be closed and the windings held firmly in place by the simple and very advantageous arrangement of inserting an internal tubular member.

FIGURE 2 shows an illustrative embodiment of a motor, generally indicated at 20, incorporating the present invention. Stator 21, which may consist of a stack of laminations like lamination 11 in FIGURE 1, and which has windings positioned in the appropriate winding slots 15, is then aligned, fixed and, in a sense, sealed by the insertion through its center of tubular member 22 which preferably is a one piece tube thrust into place by force fitting. The axis of stator 21 automatically becomes the same as the axis of tubular member 22 when the latter is positioned in the stator opening. A rotor 23, carried on shaft 24, may therefore be centered within the stator opening with minimum air gap clearance between its outer surface and the inner surface of tubular member 22 and with maximum accuracy simply by pressing the two rotor bearing cartridges 25 into the respective ends of the tubular member 22.

This arrangement with its unitary and co-axial construction permits the use of a very efficient anti-vibrational mounting for the motor. To this end, bearing cartridges 25 each have a reduced-diameter shoulder portion around which a circular groove 26 is cut. Each groove 26 carries a circular mounting ring 27, for example an ordinary O-ring gasket, made of some suitable resilient material such as rubber or the like which can be clamped between its respective bearing shoulder and a fixed mounting frame for the motor. Any vibration produced by the motor will then be absorbed by these rings before reaching the frame. A certain amount of desirable torsional play or give is permitted even though the motor is firmly clamped at its two ends.

The increase in uniformity of the magnetic field around the stator poles of motor 20 is due to the fact that tubular member 22 is made of magnetic material and therefore acts to close the air gaps between stator poles. This, as explained previously, makes the magnetic field around the rotor more nearly uniform and because of this increase in uniformity, rotor 23 turns with a more nearly uniform speed and with less vibration than it would otherwise, and, of course, motor operation is more efficient.

The material from which tubular member 22 is made should preferably be one which permits a stator magnetic field in the space within the tubular member to be as large as possible and most nearly free of harmonic components. This material should thus be determined for each individual type of motor. In a fractional horsepower (approximately 1/100 H.P.) four pole capacitor-start induction-run motor built according to the invention, tubing of stainless steel, such as that known in the trade as type #430, 0.020 inch thick has proved satisfactory. Sintered iron may also be suitable in certain types of motor since a wide range of magnetic permeability can be obtained with this material simply by varying its density during the manufacturing process. In any event, the magnetic shielding of the field around the rotor and its shaft by tubular member 22 when made of any good magnetic material makes a motor such as disclosed herein particularly suitable for applications requiring low stray field radiation, as is the case when it is necessary to locate a motor close to electronic equipment susceptible to hum pickup. Since the thickness of tubular member 22 is small, the losses due to eddy currents in it are negligible.

In a four-pole, capacitor-start, induction-run motor, which has been built according to the present invention, structural dimensions were as follows: outside diameter of stator laminations 21, 2.5 inches; axial length of stator laminations, 1.2 inches; length of the one piece tube 22, 2.2 inches; outside diameter of the one piece tube, 1.25 inches; and air gap between inside of one piece tube 22 and rotor 23, 0.006 inch.

The horsepower rating of a motor such as has been described above can be increased merely by increasing its length, i.e. by lengthening the rotor 23 and tubular member 22 and by including more laminations in the stator. This makes it possible to build a motor of small over-all diameter but yet one having extremely high power. Since tubular member 22 is able to provide the sole mounting frame for both stator and rotor, it is not necessary to use an external enclosing frame, and the weight of a motor for a given power can be appreciably reduced.

The stator of a motor according to this invention, including its windings, can easily be encapsulated in a hermetic sealing compound, such as an epoxy resin. These parts will then be permanently protected against moisture, corrosion, and against impact and vibrational shocks. They will, in effect, be impervious to all causes of motor breakdown except overloading and, by proper design, even this last can be avoided. To encapsulate the stator in sealing compound, it is first assembled, together with its windings, on the tubular member. This member, because of its one piece construction, then can serve as the inner wall of a mould for the sealing compound to prevent it from filling the rotor space in the stator; or the ends of the tubular member can be plugged and the entire assembly can be immersed in the sealing compound. Similar sealing of a conventional motor stator not having the tubular member of the present invention is evidently either impossible or else far more difficult.

As seen in FIGURE 3, by placing two rotors 23a and 23b on a single shaft 24', supported by bearings 25', and by placing respective stators 21a and 21b for each rotor on a unitary tubular member 22' surrounding these rotors, a single motor adapted to run at either of two separate speeds can be obtained. Or, if both sections of such a double motor be designed to operate at the same speed, one section can be used for a normal load and, when necessary to handle an overload, the second section can be switched on. In such arrangements the motor can be built to operate at maximum efficiency in both of the conditions of speed or load rather than in only one as has generally been possible previously.

To illustrate an additional advantage of using the tubular construction of this invention in any motor, as described above, there is shown in FIG. 3, concentric with and connected to the left end of tubular member 22', a speed-changing gear-box 32. This gear-box, since it is also supported by the tubular member 22, can readily be fitted to the motor in proper alignment. Thus no elaborate machining is necessary and the mechanical tolerances need not be as fine as is usually required in other usual motor and gear-box constructions. Moreover the size of gear-box 32 can be held to a minimum.

The above description is intended in illustration and not in limitation of the invention. Various changes and modifications may occur to those skilled in the art and these changes and modifications may be made without departing from the spirit or scope of the invention as set forth.

What is claimed is:

A small, high-efficiency electric motor comprising a rotor, a stator, a one-piece thin tubular member of ferromagnetic material tightly fitted inside the stator and closely surrounding the rotor, said member closing the winding slots of the stator, two bearing cartridges each snugly fitted in a respective end of the tubular member and having axial bearings for supporting said rotor co-axially inside said tubular member, each cartridge being in the shape of two cylindrical portions of unequal diameter with an intermediate flange, the cylindrical cartridge portions with the larger diameter engaging the ends of the tubular member with the flanges abutting the ends of said member, the cylindrical portions with the smaller diameter extending outward and having peripheral grooves, and thin rings of resilient material mounted in said grooves by means of which the bearing cartridges and motor are supported in a frame.

References Cited in the file of this patent

UNITED STATES PATENTS

| | | |
|---|---|---|
| 1,195,269 | Ross | Aug. 22, 1916 |
| 1,839,299 | Cornu | Jan. 5, 1932 |
| 2,004,866 | Haldeman | June 11, 1935 |
| 2,074,136 | Welch | Mar. 16, 1937 |
| 2,127,847 | Schulte | Aug. 23, 1938 |
| 2,261,477 | Kuner | Nov. 4, 1941 |
| 2,396,738 | Maxwell | Mar. 19, 1946 |
| 2,463,936 | Allison | Mar. 8, 1949 |
| 2,573,126 | Andrus | Oct. 30, 1951 |
| 2,721,280 | Dills | Oct. 18, 1955 |
| 2,730,636 | Dunn | Jan. 10, 1956 |

FOREIGN PATENTS

| | | |
|---|---|---|
| 147,913 | Switzerland | Sept. 1, 1931 |
| 269,308 | Switzerland | Oct. 2, 1950 |